J. NEWMANN.
MULTIPLE ROW BALL BEARING.
APPLICATION FILED AUG. 2, 1917.
1,266,146.
Patented May 14, 1918.
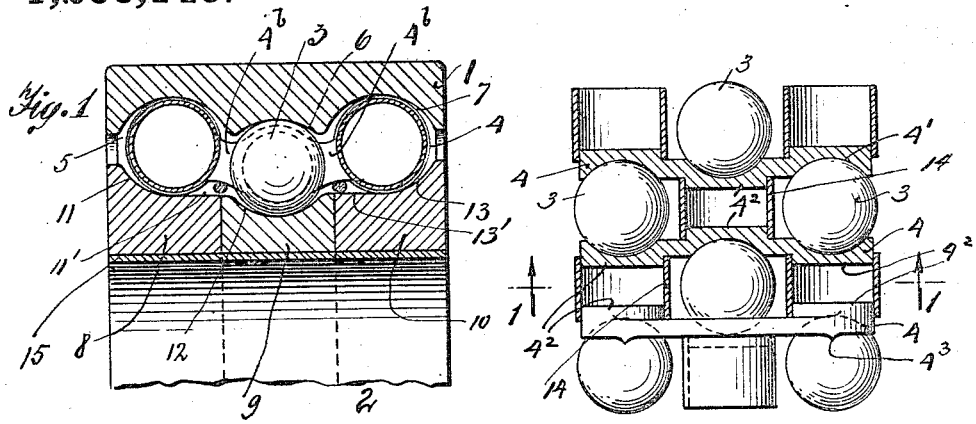
Fig. 1
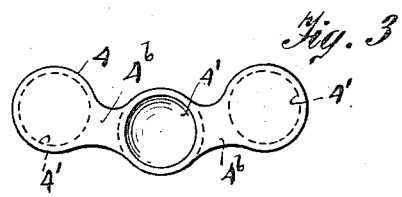
Fig. 3
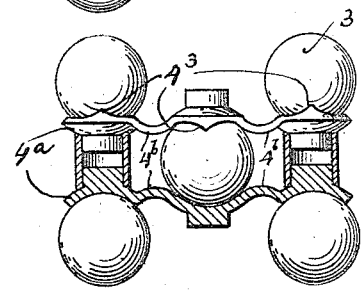
Fig. 4
Fig. 5
Inventor
John Newmann
By his Attorney

UNITED STATES PATENT OFFICE.

JOHN NEWMANN, OF NEW YORK, N. Y.

MULTIPLE-ROW BALL-BEARING.

1,266,146.

Specification of Letters Patent.   Patented May 14, 1918.

Application filed August 2, 1917.   Serial No. 184,046.

*To all whom it may concern:*

Be it known that I, JOHN NEWMANN, a citizen of the United States, residing in the city of New York, county of Kings, and State of New York, have invented certain new and useful Improvements in Multiple-Row Ball-Bearings, of which the following is a specification.

The present invention relates to ball bearings and particularly to the kind employing two, three or more rows of balls and has for its object to provide a durable ball bearing of simplified construction and in which the different rows of balls can be easily and readily assembled.

A further object of my invention is to provide spacers or separators whereby the balls of the several rows will be spaced and held in position.

Another object of this invention is to provide means for joining the several spacers into a unit in form of a cage, whereby the falling apart of the parts in case of breakage of one or a few balls will be prevented.

With these and other objects in view this invention consists in the construction, arrangement and combination of parts as will be hereinafter fully described and set forth in the appended claims.

In the accompanying drawing which forms part of this specification and in which similar reference numerals denote corresponding parts; Figure 1 is a section of my new bearing and of one of the spacers on line 1—1 of Fig. 2; Fig. 2 is a sectional plan view of the bearing with the outer ring removed and the spacers and balls shown in a stretched out position; Fig. 3 is an elevation of one of my new spacers; Fig. 4 is a sectional view of a part of a modified spacer; and Fig. 5 is a similar view as Fig. 2 showing another modification of the spacer.

Referring more specifically to the drawing and particularly to Figs. 1, 2 and 3, the bearing comprises an outer ring or "cone" 1, an inner ring or cone 2, three rows of balls 3 of equal size and my new spacers 4. The outer ring is provided on its inner circumference with annular grooves or races 5, 6 and 7 of circular cross section and suitably spaced apart so that the balls borne therein will be held from contact with one another. The intermediate race 6 is arranged out of alinement with the end races 5 and 7 and extending toward the center of the ring, in order to produce sufficiently long shoulders at the ends of the races separating the balls, without increasing the width of the bearing.

The inner ring 2 is composed of three separate parts or sections 8, 9 and 10, each of which is formed with an annular groove of circular cross section 11, 12, 13 respectively. The intermediate section 9 with its groove 12 is adapted to coöperate with the race 6 to support the middle row of balls, and has its race 12 correspondingly deeper than the races 11 and 13 in the end sections 8 and 10. Furthermore while the middle sections are formed at each end with a protecting shoulder or flange, the end sections 8 and 10 have each their inner shoulders cut away so that from the deepest point of their races to the inner edges of the respective sections an even cylindrical surface 11′ and 13′ respectively is formed.

This construction is necessary in order to enable the insertion of the end sections after the different rows of balls have been completely assembled in the races of the outer ring. The middle ring 9 is inserted into the bearing before the balls are assembled and to enable the assembling of the balls the said ring in well known manner may be displaced into eccentric position and subsequently restored to concentric position. The balls having been assembled between the outer ring and the middle section of the inner ring, they are spaced apart and into the spaces between these balls are inserted the spacers 4. These spacers each consists of an oblong piece of metal which may be formed by punching or otherwise to conform with the annular space formed between the two rings when assembled.

Thus far the construction shown in Fig. 1 in which the races 5, 6 and 7 in the outer ring and the races 11, 12 and 13 in the inner ring are not in alinement, the pieces 4 are correspondingly curved as shown more clearly in Fig. 3. These pieces are lodged in upright positions between the balls of the middle row to project with their ends across the end races of the bearing. Each piece 4 is formed in its side surfaces with cavities 4′ of circular cross section, there being as many cavities therein as there are rows of balls. According to the number of rows used the cavities may be all on one side or partly on one and partly on the opposite side, the former being arranged for the middle row of balls and the latter cavities at the ends of the spacer for the end rows of balls.

In assembling the parts the spacers are inserted one by one and simultaneously the balls of the end rows are placed between two adjoining spacers with the balls of the middle row engaging the middle cavities of the two adjoining separators and those of the end rows resting in the end cavities of two adjoining spacers so that the balls of the three rows become joined together into a unit supporting one another.

To steady the position of the different spacers relative to one another and to prevent the displacement of the spacers or their falling apart in case of breakage of one or more balls I provide the following constructions:

Each spacer 4 may be provided with cylindrical projections 4², which may advantageously be arranged on the opposite side of each cavity, in order to at the same time serve as a reinforcement. These projections are each a little shorter than half the width between two adjoining spacers and are adapted to snugly fit in a short tubing 14. In assembling the parts the spacers are placed with the projections 4² of one facing those of the adjoining one, so that the tubings 14 can be mounted over a pair of opposite projections connecting thus the adjoining spacers together.

In such manner all spacers are connected into a unit.

Instead of the separate tubings 14 the projections 4³ may be made hollow and so admeasured that those of one spacer will telescopically engage those of the opposite or adjoining spacer, as shown in Fig. 4.

In Fig. 2 the spacers 4 are shown as solid castings. Instead of that, however, the spacers 4ᵃ may be punched out of sheet metal as shown in Fig. 5. It remains to be stated that the sections, 8, 9 and 10 after the parts are assembled may be joined together by a bushing 15 in well known manner.

In order to prevent the balls from leaving the cavities in the spacers in the course of assembling the parts, each spacer may be provided with a short angular projection or nose 4⁴ which extends from a point of the outer circumferential edge of the cavity, the nose being adapted to enlarge the bearing surface around the upper part of the ball borne therein and thereby support the ball when the inner cone is revolved around its horizontal axis during the assembling of the balls and separators, with the ball bearing construction of Figs. 6 and 7. For the construction shown in Fig. 1 the nose 4⁴ can be dispensed with.

It may also be necessary, as a further safeguard against falling apart of the balls and spacers while being assembled or before the end sections 8 and 10 are inserted, to use a split ring 16 or the like which may be placed around the assembled spacers to prevent their displacement. The rings may be advantageously mounted around the outer edges of the neck portions 4⁶ formed around the inner edges of the same as shown in Fig. 1. The ring 16 will expand the spacers and thereby insure their relative positions. If desired the ring or rings need not be removed but may be left in the bearing to permanently engage around the assembled spacers.

In the construction shown in Fig. 1, the balls in the end races will by reason of a one-sided pressure or thrust thereon due to the outer shoulder of the end sections, 8 and 10, have their bearing points located on diameters which are inclined to the central diameter passing through the bearing points of the central row of balls. Now, since the radii of these end races are larger than the radius of the inner or central race, the balls in the end races will naturally revolve faster than the balls of the middle or central race and have the tendency to crowd toward the balls of the central race. To render the travel of the balls in the different races more uniform and thereby avoid as much as possible the above named tendency, the curvature of the end grooves in the outer and inner ring may be so chosen as to permit the use of correspondingly larger balls in the end races than those of the middle race.

Similarly the balls of the central row of the construction shown in Fig. 6 may be made larger than the balls of the end races and the annular groove in the inner ring 2¹ for said central row of balls will be correspondingly enlarged.

It must also be mentioned that with the construction according to Figs. 6 and 7 in order to allow the insertion of the last ball in one of the end rows, the shoulder of one of the end races must be cut away at one point to an extent as to admit the entry of the ball. It will be clear that by reason of a certain resiliency inherent in the spacers the provision of a cut is required only on one side of the bearing, for before the insertion of the last ball in the end row of that side, the spacers can be stretched apart to permit the squeezing in of the end ball in the opposite side.

Since the construction may be variously modified without departing from the principle of my invention I do not wish to restrict myself to the details thereof.

What I claim and desire to secure by Letters Patent is:

1. A ball bearing comprising an outer ring having several races, a sectional inner ring, each section having a race, the end races being at their inner sides even with the deepest point thereof, and spacers between the balls, each spacer being adapted to embrace a part of a ball of each row.

2. A spacer for a multiple ball bearing consisting of an oblong piece of metal having several cavities in it to engage a ball of each row and means thereon for joining adjacent spacers together.

3. A spacer for a multiple ball bearing consisting of an oblong piece of metal having cavities in its sides of circular cross section to serve as sockets for balls and a projection on the marginal edge of each cavity to increase the bearing surface for the ball resting therein.

4. A spacer for a multiple ball bearing consisting of an oblong piece of metal having cavities in its sides to form sockets for balls and projections on said spacer serving for the connection of adjacent spacers with one another.

5. In a ball bearing the combination with an inner and an outer ring, and several rows of balls therebetween, of spacers extending across the annular space between the rings and each adapted to engage a ball of each row and means on said spacers to join the several spacers into a unit.

6. In a ball bearing the combination with an inner and outer ring and several rows of balls therebetween, of spacers extending across the annular space between the rings and each formed with several cavities to engage a part of a ball of each row and means for joining the several spacers into a cage or unit.

7. In a triple ball bearing, the combination with three rows of balls, of an outer ring having three annular grooves of circular cross section of which the middle groove is arranged radially displaced toward the center of the ring relative to the end grooves, and an inner ring composed of three separate annular sections each having an annular groove of circular cross section being radially displaced toward the center of said ring relative to the end grooves.

In testimony whereof, I affix my signature in presence of two witnesses.

JOHN NEWMANN.

Witnesses:
MAX D. ORDMANN,
A. M. WATTENBERG.

Copies of this patent may be obtained for five cents each, by addressing the "Commissioner of Patents, Washington, D. C."